(12) United States Patent
Hsieh et al.

(10) Patent No.: US 7,747,786 B2
(45) Date of Patent: Jun. 29, 2010

(54) INDICATING CIRCUIT FOR INDICATING NETWORK STATUS

(75) Inventors: Ming-Chih Hsieh, Taipei Hsien (TW); Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 724 days.

(21) Appl. No.: 11/625,287

(22) Filed: Jan. 20, 2007

(65) Prior Publication Data

US 2008/0091400 A1    Apr. 17, 2008

(30) Foreign Application Priority Data

Oct. 11, 2006    (CN)    .................... 2006 1 0063037

(51) Int. Cl.
*G06F 15/16* (2006.01)
*G08B 9/00* (2006.01)
*G08B 5/22* (2006.01)
*H04L 12/66* (2006.01)

(52) U.S. Cl. ............. 709/250; 340/286.02; 340/815.45; 370/463

(58) Field of Classification Search .................... 703/14; 709/200
See application file for complete search history.

(56) References Cited

U.S. PATENT DOCUMENTS

| 4,409,656 | A | * | 10/1983 | Andersen et al. ............ 709/250 |
|---|---|---|---|---|
| 5,127,067 | A | * | 6/1992 | Delcoco et al. ................ 385/24 |
| 5,189,314 | A | * | 2/1993 | Georgiou et al. ............. 327/114 |
| 5,293,332 | A | * | 3/1994 | Shirai ..................... 365/189.02 |
| 5,596,575 | A | * | 1/1997 | Yang et al. .................... 370/468 |
| 6,700,898 | B1 | * | 3/2004 | Barakat et al. ............... 370/442 |
| 6,950,030 | B2 | | 9/2005 | Kovarik et al. |
| 6,987,737 | B2 | * | 1/2006 | Castellano et al. .......... 370/248 |
| 7,395,454 | B1 | * | 7/2008 | Wohlgemuth et al. ......... 714/30 |
| 2001/0043093 | A1 | * | 11/2001 | Sakura et al. ................ 327/108 |
| 2003/0154311 | A1 | * | 8/2003 | Critz et al. ................... 709/250 |
| 2003/0184363 | A1 | * | 10/2003 | Lopata et al. ............... 327/544 |
| 2004/0176927 | A1 | * | 9/2004 | Chen et al. ................... 702/182 |
| 2005/0210123 | A1 | * | 9/2005 | Wang et al. .................. 709/218 |

\* cited by examiner

*Primary Examiner*—Saleh Najjar
*Assistant Examiner*—Robert Shaw
(74) *Attorney, Agent, or Firm*—Wei Te Chung

(57) ABSTRACT

An indicating circuit for indicating network status includes a signal generating unit configured for being set in a kernel board, and an indicator circuit configured for being set in a device board. The signal-generating unit includes a logic circuit with two input terminals and an output terminal, a network IC with two output pins connected to the two input terminals of the logic circuit respectively for sending status signals to the logic circuit, and a micro control unit (MCU) for transmitting a network transmitting speed signal from the network IC. The indicator circuit has two input terminals, one is connected to the MCU of the signal-generating unit to receive the network transmitting speed signal and the other is connected to the output terminal of the logic circuit to receive a status signal for indicating the network status.

5 Claims, 5 Drawing Sheets

INDICATING CIRCUIT FOR INDICATING NETWORK STATUS

BACKGROUND OF THE INVENTION

1. Field of the Invention

The present invention relates to an indicating circuit, and more particularly, to an indicating circuit for indicating network status.

2. Description of Related Art

There are two types of indicating circuits for indicating network status through indicating units such as LEDs: 1) a first type of indicating circuit indicates the networks according to the combination of two status signals designated Speed and Link, 2) a second type of indicating circuit indicates the network status according to two status signals independent from each other designated 10M/LINK/ACTIVITY and 100M/LINK/ACTIVITY. Referring to FIG. 4, a first type of indicating circuit includes a first type of network IC 10, a NOT gate U1, two LEDs L1, L2, and a resistor Ra. The network IC 10 includes a Speed pin connected to an anode of the LED L1 and an input terminal of a NOT gate. An output terminal of the NOT gate is connected to an anode of the LED L2. A node A between two cathodes of the two LEDs L1, L2 is connected to a Link pin of the network IC 10 through the resistor Ra. The NOT gate U1, the two LEDs L1, L2 and the resistor Ra constitute an indicator circuit. The network IC 10 is set in a kernel board, and the indicator circuit is set in a device board.

Level/value of the Link pin corresponding to the network status, and level/value of the Speed pin corresponding to the network transmitting speed are listed as below:

TABLE 1

| Network status | Level/value of Link pin |
|---|---|
| Linked | Low/0 |
| Not linked | High/1 |
| Transmitting and Receiving | Alternating between 0, 1 |

TABLE 2

| Network transmitting speed | Level/value of Speed pin |
|---|---|
| 10 Mbps | High/1 |
| 100 Mbps | Low/0 |

According to Table 1, value at the Link pin is 0 when the network is "linked", and is 1 when the network is "not linked". When the network is "transmitting and receiving", the value at the Link pin alternates between 0 and 1. According to Table 2, the value at the Speed pin is 1 when the speed of the network is 10 Mbps, and is 0 when the speed of the network is 100 Mbps. So when the network speed is 10 Mbps and the network is "linked", the LED L1 lights up. When the network speed is 100 Mbps and the network is "linked", the LED L2 lights up. When the network speed is 10 Mbps and the network is "transmitting and receiving", the LED L1 blinks. When the network speed is 100 Mbps and the network is "transmitting and receiving", the LED L2 blinks. When the network is "not linked", the two LEDs L1 and L2 remain off.

Referring to FIG. 5, a second type of indicating circuit includes a second type of network IC 30, two resistors Rb, Rc, and two LEDs L3, L4. A 10M/LINK/ACTIVITY pin of the network IC 30 is connected to an anode of the LED L3 through the resistor Rb, and a 100M/LINK/ACTIVITY pin of the network IC 30 is connected to an anode of the LED L4 through the resistor Rc. Cathodes of the two LEDs L3 and L4 are grounded. The two resistors Rb and Rc, the two LEDs L3 and L4 constitute an indicator circuit. The network IC 30 is set in a kernel board, and the indicator circuit is set in a device board. When the network speed is 10 Mbps and the network is "linked", the LED L3 lights up. When the network speed is 100 Mbps and the network is "linked", the LED L4 lights up. When the network speed is 10 Mbps and the network is "transmitting and receiving", the LED L3 blinks. When the network speed is 100 Mbps and the network is "transmitting and receiving", the LED L4 blinks. When the network is "not linked", the two LEDs L3, L4 remain off.

According to the FIGS. 4 and 5, an indicator circuit is only compatible with a specified network IC, so different indicator circuits are needed corresponding to different network ICs. Sometime the network IC in the kernel board must be changed, and the indicator circuit in the device board must also be changed in accordance with the network IC. However, when specifications of customer orders for the kernel boards change, and current device boards on hand are not compatible with the new order, the device board has to be redesigned and tested, which increases costs and wastes time.

What is needed is an indicating circuit comprising an indicator circuit compatible with different types of network ICs.

SUMMARY OF THE INVENTION

In one preferred embodiment, an indicating circuit for indicating network status includes a signal generating unit configured for being set in a kernel board, and an indicator circuit configured for being set in a device board. The signal-generating unit includes a logic circuit with two input terminals and an output terminal, a second type of network IC with two output pins connected to the two input terminals of the logic circuit respectively for sending status signals to the logic circuit, and a micro control unit (MCU) for transmitting a network transmitting speed signal from the network IC. The indicator circuit has two input terminals, one is connected to the MCU of the signal-generating unit to receive the network transmitting speed signal and the other is connected to the output terminal of the logic circuit to receive a status signal for indicating the network status.

Other advantages and novel features of the present invention will become more apparent from the following detailed description of preferred embodiment when taken in conjunction with the accompanying drawings, in which:

DETAILED DESCRIPTION OF THE INVENTION

Figure 1:
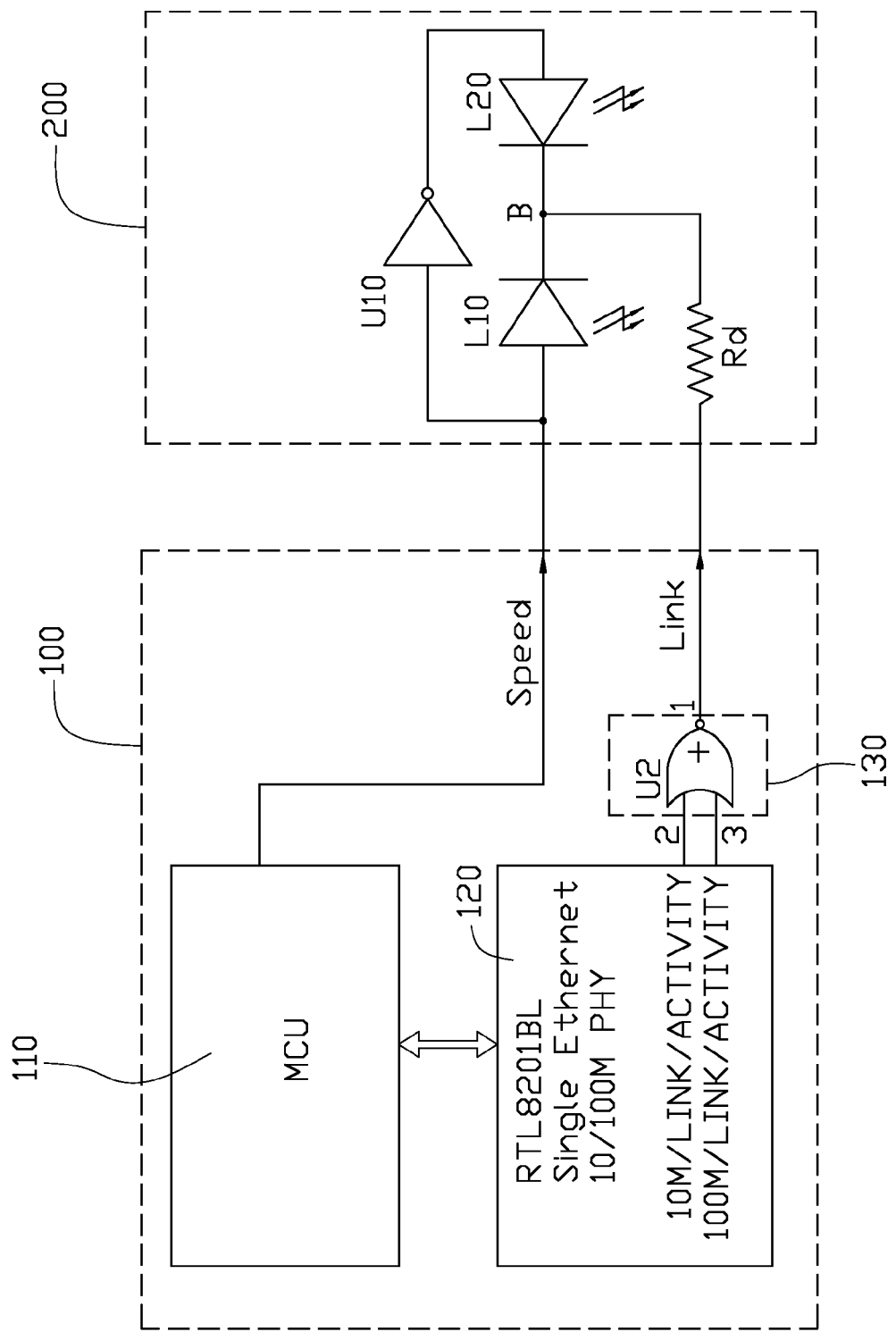
FIG. 1 is a circuit diagram of an indicating circuit for indicating network status in accordance with a preferred embodiment of the present invention, the indicating circuit includes a logic circuit.

Referring to FIG. 1, an indicating circuit for indicating network status in accordance with a preferred embodiment of the present invention is shown. The indicating circuit includes a signal-generating unit 100 in a kernel board, and an indicator circuit 200 in a device board. The signal-generating unit 100 includes a second type of network IC 120 for generating two signals independent from each other, a logic circuit 130 with two input terminals designated 2 and 3 and an output terminal designated 1, a micro controller unit (MCU) 110 for transmitting a network transmitting signal designated Speed from the network IC 120. The indicator circuit 200 includes a NOT gate U10, a first LED L10, a second LED L20, and a resistor Rd. The two input terminals 2 and 3 of the logic circuit 130 are respectively connected to a 10M/LINK/ACTIVITY pin and a 100M/LINK/ACTIVITY pin of the network IC 120. An input terminal of the NOT gate U10 and an anode of the first LED L10 receive the network transmitting signal Speed. An output terminal of the NOT gate U10 is connected to an anode of the second LED L20. The output terminal 1 of the logic circuit 130 is connected to a node B between cathodes of the two LEDs L10, L20 via the resistor Rd. The MCU 110 of the signal-generating unit 100 receives the network transmitting signal Speed from the network IC 120, and transmits the signal Speed to the input terminal of the NOT gate U10 and the anode of the first LED L10. The logic circuit 130 in this embodiment is a NOR gate. The logic circuit 130 outputs a signal designated Link according to the level/value at the output pins 10M/LINK/ACTIVITY and 100M/LINK/ACTIVITY. Table 3 shows level/value of the signal Link corresponding to the level/value at the output pins 10M/LINK/ACTIVITY and 100M/LINK/ACTIVITY.

TABLE 3

| Pins | Level/value | | | |
|---|---|---|---|---|
| 10M/LINK/ACTIVITY | High/1 | Low/0 | Low/0 | High/1 |
| 100M/LINK/ACTIVITY | Low/0 | High/1 | Low/0 | High/1 |
| Link | Low/0 | Low/0 | High/1 | N/A |

When the network transmitting speed is 10 Mbps, the value of the signal Speed is High/1, and when the network transmitting speed is 100 Mbps, the value of the signal Speed is Low/0. When the value of the signal Speed is High/1 and the signal Link is Low/0, which occurs when the 10M/LINK/ACTIVITY pin is 1, the first LED L10 lights up. When the signal Speed is Low/0 and the value of the signal Link is Low/0, which occurs when the 100M/LINK/ACTIVITY pin is 1, the second LED L20 lights up. During transmission and receiving, at either speed, the corresponding LED L10, L20 blinks. When the 10M/LINK/ACTIVITY pin and 100M/LINK/ACTIVITY pin are both 0, causing the signal Link to go to 1, the first and second LEDs L10 and L20 remain off.

Figure 2:
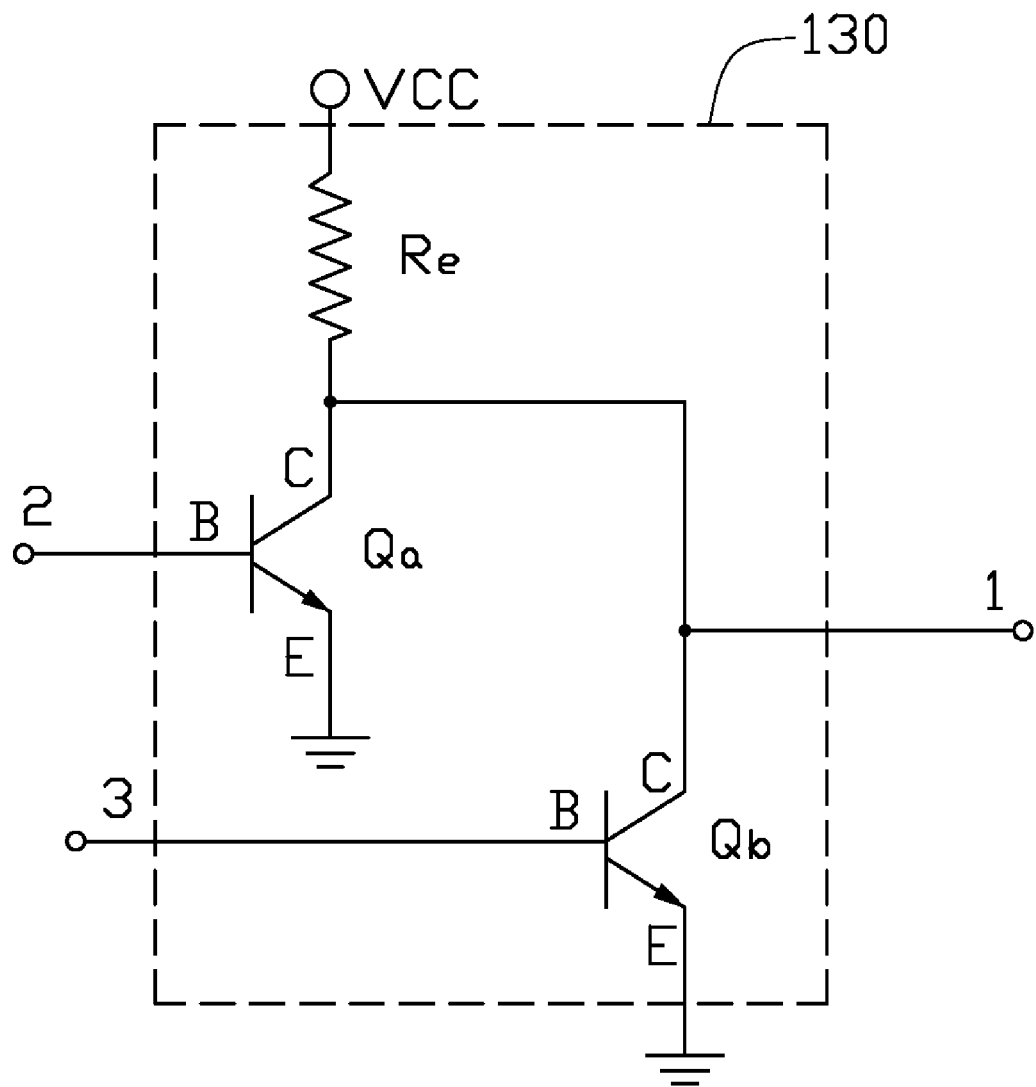
FIG. 2 is a circuit diagram of an alternative logic circuit of the indicating circuit of FIG. 1.

Referring to FIG. 2, the logic circuit 130 in accordance with a preferred embodiment of the indicating circuit includes a power supply source Vcc, a first NPN transistor Qa, a second NPN transistor Qb, and a resistor Re. Bases of the first transistor Qa and the second transistor Qb are used as the input terminals 2 and 3 of the logic circuit 130, the two input terminals 2 and 3 are respectively connected to the 10M/LINK/ACTIVITY pin and 100M/LINK/ACTIVITY pin of the network IC 120; a collector of the first transistor Qa is connected to the power supply source Vcc through the resistor Re; emitters of the first transistor Qa and the second transistor Qb are all grounded. The collector of the first transistor Qa and a collector of the second transistor Qb are connected together as the output terminal 1 of the logic circuit 130.

Figure 3:
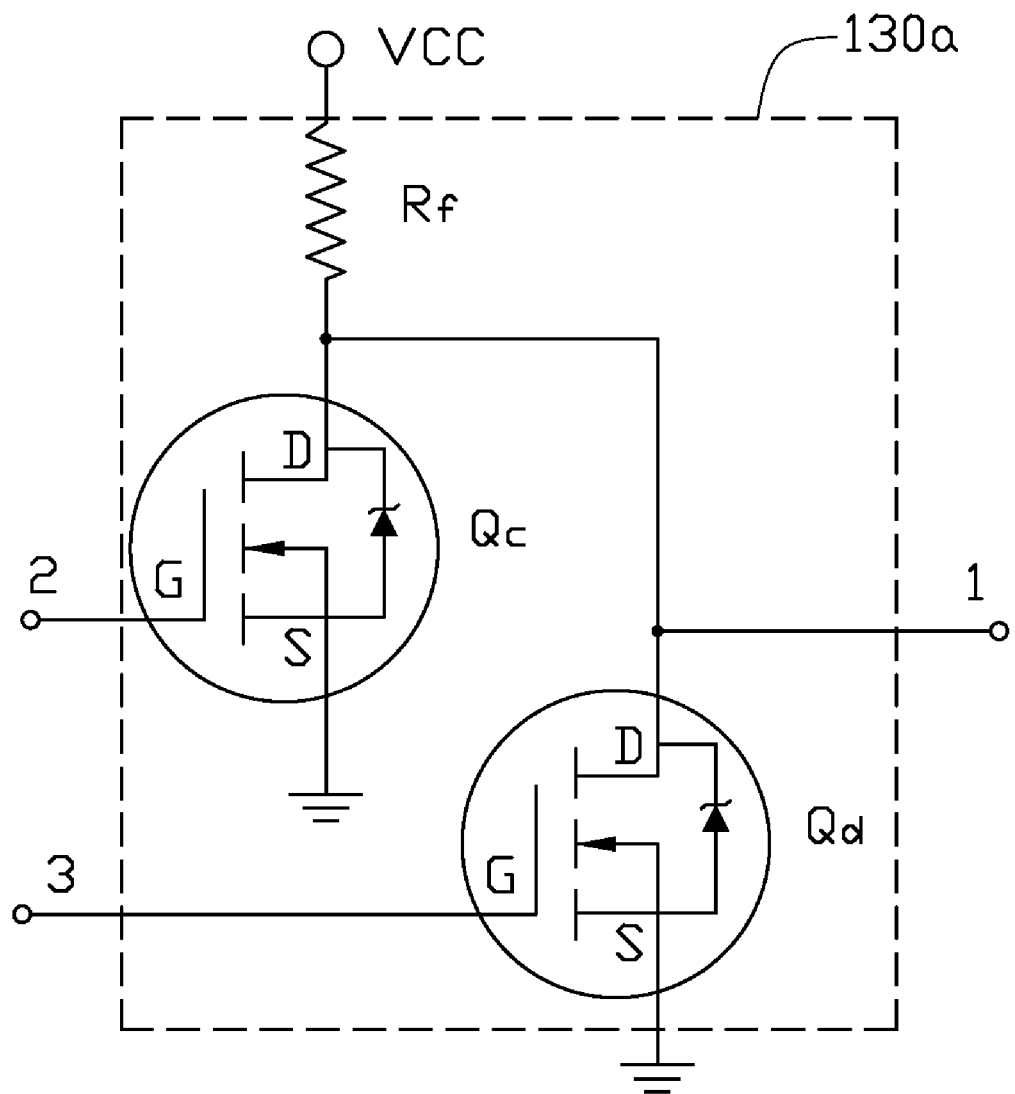
FIG. 3 is a circuit diagram of another alternative logic circuit of the indicating circuit of FIG. 1.

Referring to FIG. 3, the logic circuit 130a in accordance with an alternative embodiment of the indicating circuit includes a power supply source Vcc, a first N-channel metal-oxide-semiconductor field-effect transistor (MOSFET) Qc, a second N-channel MOSFET Qd, and a resistor Rf. Gates of the first and second MOSFETs Qc and Qd are used as the input terminals 2 and 3 of the logic circuit 130a, the two input terminals 2 and 3 are respectively connected to the 10M/LINK/ACTIVITY pin and 100M/LINK/ACTIVITY pin of the network IC 120; a drain of the first MOSFET Qc is connected to the power supply source Vcc through the resistor Rf; sources of the first and second MOSFETs Qc and Qd are all grounded. The drain of the first MOSFET Qc and a drain of the second MOSFET Qd are connected together as the output terminal 1 of the logic circuit 130a.

Figure 4:
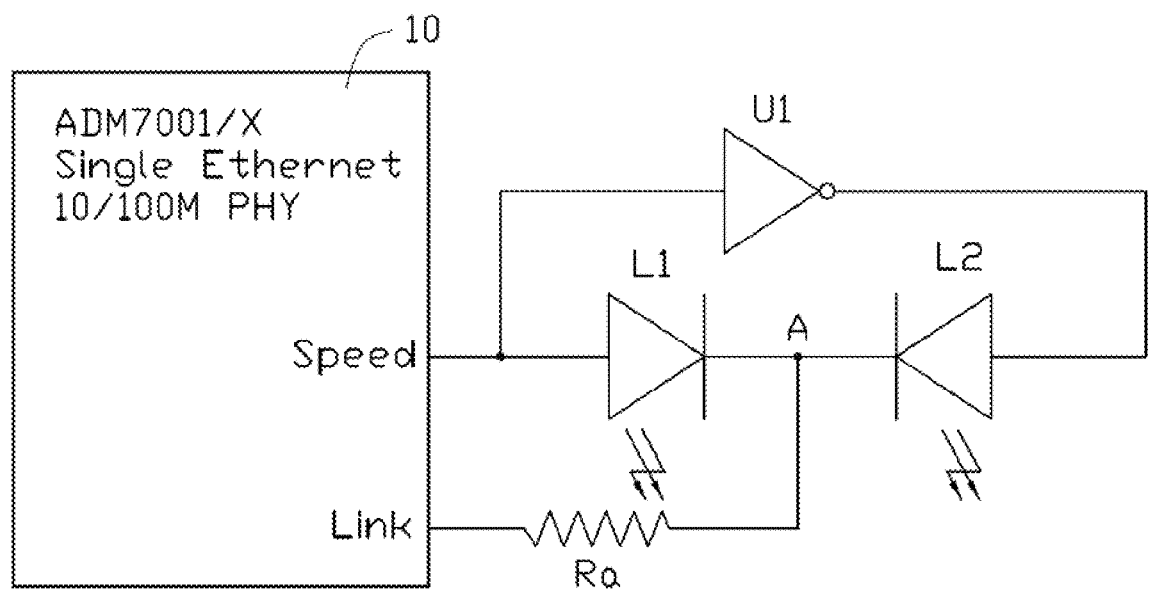
FIG. 4 is a circuit diagram of a conventional indicating circuit employing the combination of two status signals.
Figure 5:
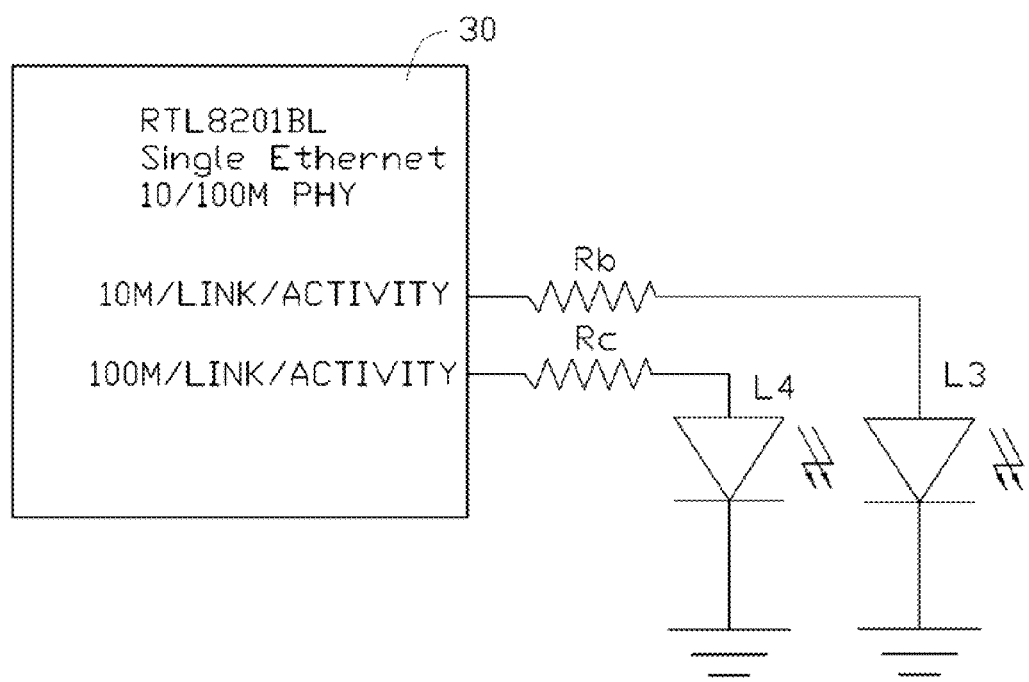
FIG. 5 is a circuit diagram of a conventional indicating circuit employing two signals independent from each other.

By adding the logic circuit 130 and the MCU 110 between the network IC 120 and the indicator circuit 200 in the kernel board, the indicator circuit 200 in the device board, which is directly compatible with the first type of network IC 10 as shown in FIG. 4, is also compatible with the second type of network IC 30 as shown in FIG. 5. So when specifications of customer orders for the kernel boards change, the device board has no need to be redesigned and tested, which saves costs and time.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. A network status indicating circuit, comprising:
   an indicator circuit with two input terminals set in a device board, comprising:
      a speed input terminal of the indicator circuit to receive a network transmitting speed signal; and
      a status input terminal of the indicator circuit to receive a network transmitting status signal; and
      two LEDs for indicating network status and speed, wherein the network status includes linked, not linked, active, and/or transmitting/receiving;
   a network status transmitter, comprising:
      a first type of network IC for generating network transmitting status signals and network transmitting speed signals, the first type of network IC having a Speed output pin and a Link output pin connected to the speed input and status input terminals of the indicator circuit respectively; or
      a signal generating unit set in a kernel board, the signal generating unit comprising:
      a logic circuit with two input terminals and an output terminal connected to the status input terminal of the indicator circuit,
      a second type of network IC for generating network transmitting status signals and network transmitting speed signals, the second type of network IC having two output Speed/Link/Activity pins connected to the two input terminals of the logic circuit respectively for sending network transmitting status signals from the second type of network IC to the logic circuit;
      wherein the signal generating unit sends the output of the logic circuit to the status input terminal of the indicating circuit, and
      a micro control unit (MCU) for receiving the network transmitting speed signal from the second type of network IC and sending the network transmitting speed signal to the speed input terminal of the indicator circuit;

wherein the indicator circuit is compatible with both the first type of network IC and the second type of network IC for indicating network status and speed.

2. The indicator circuit of claim 1, wherein the indicator circuit comprises a NOT gate, a first LED, a second LED, and a resistor, an anode of the first LED and an input terminal of the NOT gate act as said one input terminal of the indicator circuit connected to the MCU of the signal generating unit comprising the second type of network IC or to the Speed link of the first type of network IC, an output terminal of the NOT gate is connected to an anode of the second LED, a node between two cathodes of the two LEDs act as the other input terminal of the indicator circuit connected to the output terminal of the logic circuit of the signal generating unit comprising the second type of network IC or to the Link output terminal of the first type of network IC, through the resistor.

3. The signal generating unit of claim 1, wherein the logic circuit comprises a NOR gate, two input terminals of the NOR gate are respectively connected to an Ethernet 10M/LINK/ACTIVITY pin and an Ethernet 100M/LINK/ACTIVITY pin of the second type of network IC.

4. The signal generating unit of claim 1, wherein the logic circuit comprises a first transistor and a second transistor, bases of the first and second transistors are used as two input terminals of the logic circuit, a collector of the first transistor is connected to a power supply source through a resistor, emitters of the first and second transistors are all grounded, the collector of the first transistor and a collector of the second transistor are connected together as the output terminal of the logic circuit.

5. The signal generating unit of claim 1, wherein the logic circuit comprises a first metal-oxide-semiconductor field-effect transistor (MOSFET) and a second MOSFET, gates of the first and second MOSFETs are used as two input terminals of the logic circuit, a drain of the first MOSFET are connected to a power supply source through a resistor, sources of the first and second MOSFETs are all grounded, the drain of the first MOSFET and a drain of the second MOSFET are connected together as the output terminal of the logic circuit.

* * * * *